Oct. 27, 1964 J. C. MORPHET, JR 3,154,762

SKEW INDICATOR

Filed Sept. 18, 1959 4 Sheets-Sheet 1

INVENTOR.
JOHN C. MORPHET JR.
BY
Geoffrey Knight
ATTORNEY

United States Patent Office 3,154,762
Patented Oct. 27, 1964

3,154,762
SKEW INDICATOR

John C. Morphet, Jr., Hyde Park, N.Y., assignor to International Business Machines Corporation, New York, N.Y., a corporation of New York Filed Sept. 18, 1959, Ser. No. 840,918
3 Claims. (Cl. 340—172.5)

This invention relates to magnetic recording systems and more particularly to a skew indicating system for use with a digital skew buffer such as the skew buffer shown in copending application, Serial No. 745,501 now Patent Number 2,921,296.

Ideally, the bits representing a magnetically recorded character would be disposed on the record tape in the various channels in a line perpendicular to the length of the tape, and, upon reading of the tape, such bits should be read simultaneously. It has been known, however, that the stated ideal cannot be achieved because the precise alignment between the magnetic heads and the tape is not the same during both the recording and reproducing operations. Other factors, such as variations in the tape speed and variations in the timing of electrical pulses also contribute to the disposition of the bits of any character upon the tape and the reading thereof, in a somewhat serial order. This phenomenon, known as "skew," is manifested at a time interval between the several "read-back" bits of a character. The total skew is the sum of the skew created when writing a character on tape and the skew created when reading the same character from tape.

Magnetic tape having low density recording thereon (i.e. 500 bits per inch or less) can be easily read, despite skew, with relatively simple reading and input equipment. Accordingly, it has been customary to read the bits of a character into an input register one character at a time, the bit positions of the register being held open sufficiently long to permit the storage of an entire character despite the somewhat serial arrival of the bits constituting the character. After all the skewed bits of a character have been received by an input register, it is a relatively simple matter to simultaneously transfer the bits of the character from the input register to a line register or other receiving equipment of a computer or data processing system.

Tapes having recording density of more than 5000 bits per inch and having a large number of parallel tracks on tape, are now visualized. At a recording density of 5000 bits per inch or more, the problem presented by skew becomes more troublesome and conventional data input equipment is no longer adequate to meet the problem. In the conventional deskewing method mentioned, a character gate of fixed length is started by the arrival of the first bit of the character, and it is held open for one bit period which is sufficiently long to permit the storage of an entire character despite the somewhat serial arrival of the bits constituting the character. In the high density tape system envisioned herein the bit period is much smaller than the total skew and the character gate method is, therefore, not feasible.

Regardless of the amount of skew encountered in reading a tape, the information that is recorded can be recovered if the incoming information is organized so that it can be recognized. Accordingly, the system disclosed in copending application. Serial No. 745,501 shows means whereby a high density recording can be read from tape and the bits of each character rendered intelligible to the system equipment.

Said application shows a multi-bit skew buffer comprising a bit storage buffer for each longitudinal tape channel, a read-in counter for each bit storage buffer, and a read-out counter. The bits of a character may be read into the bit storage buffers sequentially under control of the sequentially advanced read-in counters; however, the bits of any character will be read out of the various bit storage buffers simultaneously under the control of the read-out counter.

The deskewing system shown performs a number of operations which characterize its nature: it determines when a bit period is occurring, it samples the read amplifiers during such period, it enters the information in the proper position of a bit storage buffer where it is stored until all tracks have been sampled, it determines which positions of the bit storage buffer are to transfer into an output register, and finally it determines when to transfer a character from the bit storage buffers to the output register.

It is the object of this invention to provide means for measuring skew.

A further object of this invention is to provide means for indicating when skew in excess of the bit storage buffer capacity is encountered.

A further object is to provide means for indicating the maximum amount of skew that has occurred.

Other objects of the invention will be pointed out in the following description and claims and illustrated in the accompanying drawings, which disclose, by way of example, the principle of the invention and the best mode which has been contemplated of applying that principle.

Figure 1:
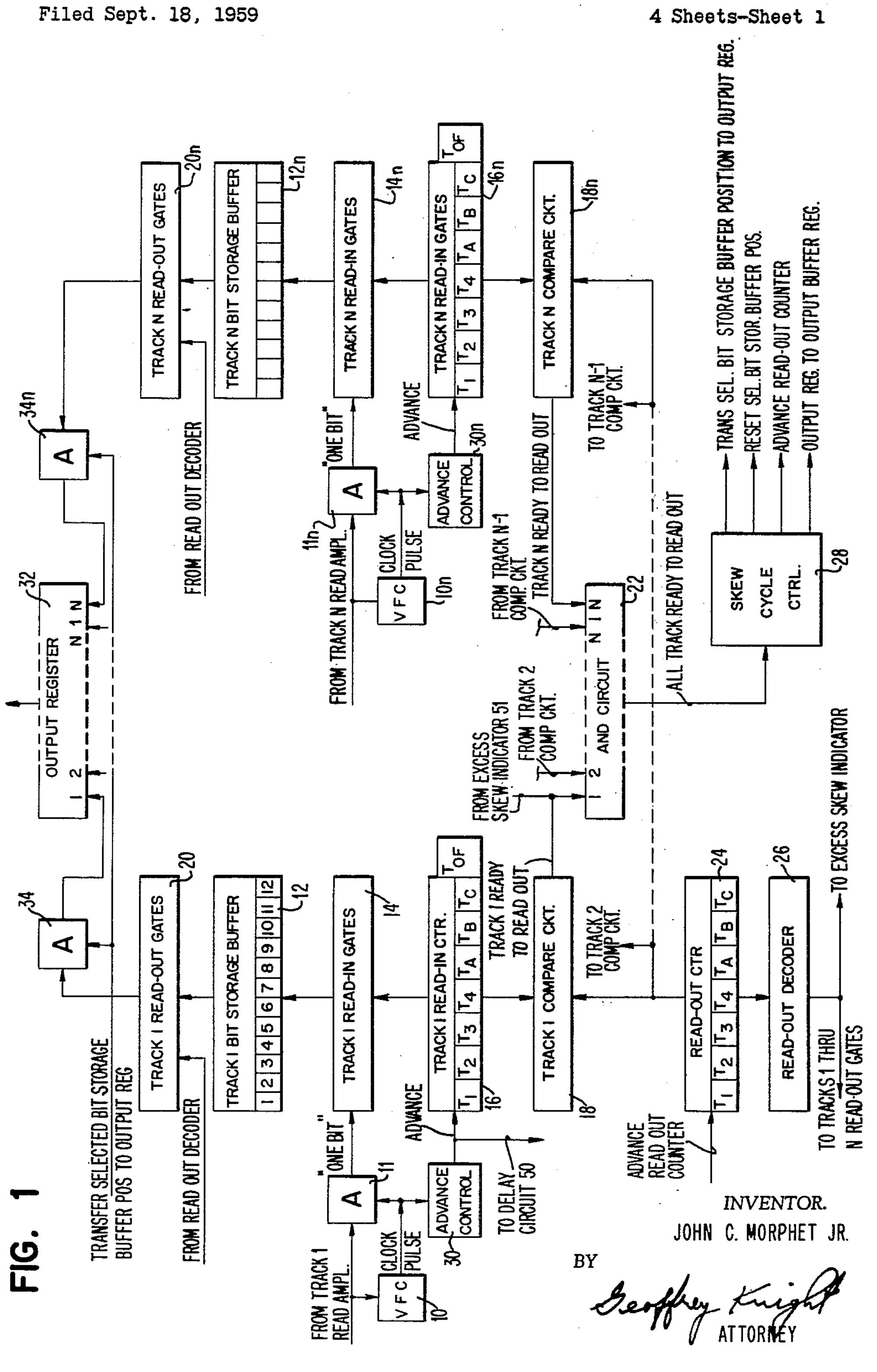
FIG. 1 is a diagrammatic illustration in block form, of a deskewing system of a type wherein this invention is applicable.

The present invention will herein be shown as applied to the deskewing system disclosed in copending application, Serial No. 745,501 now Patent Number 2,921,296. The embodiment shown is merely illustrative and the scope of the invention is not limited thereto. FIG. 1 shows the general organization of the above-mentioned deskewing system, said system having N channels. The components shown are those of channels one and channel N. The components 12, 14, 16, etc. are associated with channel one, while the components **12*n*, 14*n*, 16*n***, etc. are associated with channel N. The other channels, 2, 3, 4 . . . N–2, N–1 (not shown) will have identical components to channel N.

The several channels also have associated therewith certain circuits which are common to all the channels. Thus, it can be seen by reference to FIG. 1 that the comparing circuits 18–**18*n* for all of the channels provide inputs to a common AND circuit 22; that a common read-out counter 24 delivers its output to the comparing circuits 18–18*n*; that a common read-out decoder 26 delivers a pulse to each of the read-out gate assemblies 20–20*n*; and that the output from the common AND circuit 22 is utilized to energize the skew cycle control circuit 28, said skew cycle control circuit 28** providing common controlling impulses for the several read channels. Specific circuits for each block shown in FIG. 1 are shown in copending application, Serial No. 745,501.

In general, the system operates as follows: the signal from the magnetic transducer which reads the magnetic tape is amplified and then sampled at the precise time when an information indicating signal is occurring. The time at which this sampling occurs is under the control of the variable frequency clock 10. An example of a variable frequency clock which may be used to accomplish this function is shown in copending application, "Magnetic Recording System," by Ernest Newman, Serial No. 745,731.

The information bit obtained by the sampling process passes through AND circuit 11, through read-in gates 14 and then to the appropriate position in the bit storage buffer 12. The various channels read in asynchronously; however, the bits which constitute any character are stored in the same buffer position in each channel. Control of the read-in gates 14 which direct the information bit to the proper buffer position is effected by read-in counter 16 and advance control 30 in a manner to be described.

The bits which constitute a character are read out of all the buffers simultaneously under control of read-out counter 24 and AND circuit 22. The read-out counter 24 selects the position to be read out and AND circuit 22 allows this position to be read out only when the read-in counters indicate that each channel has read that particular information bit.

In general, the skew measuring and indicating device of this invention compares the read-in and read-out counters at a select time in the cycle, thereby obtaining a measure of the existing skew.

In the operation of the system, the read-in counters 16–16*n* are initially set to their first position, in which read-in gates 14–14*n* are conditioned to store the first bit of information from each channel in the first positions of the bit storage buffers 12–12*n*. When the first bit period occurs in each channel, a pulse from the respective variable frequency clock, 10–10*n*, will be transmitted to the respective AND circuit, 11–11*n*, thereby causing the associated tape amplifiers to be sampled (it being remembered that the several channels operate asynchronously). If the tape signal is a 1, a 1 is stored in the first position of the bit storage buffer associated with the tape track in which the 1 was sensed. If the tape signal is a 0, nothing will be stored in the first position of the bit storage buffer associated with the channel in which the 0 was sensed.

When the pulses from the variable frequency clocks 10–10*n* occur, advance pulses are generated in the advance control circuits 30–30*n* which advance the respective read-in counters 16–16*n* one position, so that position "two" thereof is turned on, thereby conditioning the circuits of the next higher read-in gate for the storage of the next information bit into the second position of the respective bit storage buffer, 12–12*n*.

Information may be read into each bit storage buffer, 12–12*n*, at any time without regard to the other channels as each channel has its own variable frequency clock 10, read-in counter 16, and bit storage buffer 12, each operating independently from the rest of the system.

The filling of a bit storage buffer cannot be a criterion for the read-out thereof. Hence, means must be provided for determining when each buffer position should be read out. The read-out is primarily controlled by the comparing circuits 18–18*n* which compare the read-out counter 24 with the read-in counter 16 in each channel.

The position of the bit storage buffers to be read out is determined by the relative setting of the read-in and read-out counters as will be described. Characters may be read into the bit storage buffers sequently as described; however, since all the bit storage buffers were set to position one when the first information bit occurred in each channel, all the bits of the first character are stored in the first position of the various bit storage buffers, all the bits of the second character are stored in the second buffer position, etc.

Initially the read-out counter 24 is set to its first position so that the read-out gate for the first buffer position is conditioned. When all the bits of the first character have been stored, a skew cycle is initiated. During this cycle, all the bits of the first character which are in the first position of the bit storage buffers will be transferred into the output register 32. Then all first positions of the bit storage buffers will be reset. After the resetting operation, the read-out counter 24 is advanced to its second position so that the read-out gates for the second position of the bit storage buffers are conditioned. Thus, the read-out counter 24 conditions the read-out gates 20–20*n* for all the tracks and in this manner the proper bits which together constitute a character are transferred into the output register 32.

The following method is used to determine when all of the bits of a character have been read into the bit storage buffers and that the character is, therefore, ready for subsequent read-out. Initially both the read-in counters 16–16*n* and the read-out counter 24 are set to their first position. The read-in counter of each track is compared with the read-out counter 24 in the comparing circuits 18–18*n*. When the count of the read-in counters 16–16*n* of all the tracks is greater than the count of the read-out counter 24, it indicates that all of the bits of a particular character have been stored and that the character may, therefore, be read out.

Comparing circuits 18–18*n* will indicate when each character is ready to be read out by transmitting a pulse to the common AND circuit 22. When all of the bits of a character are stored, (i.e. the input counter for each track is greater than the output counter 24) and consequently all of the inputs of the common AND circuit 22 are conditioned, a pulse is transmitted from the AND circuit 22 to the skew cycle control circuits 28 so that an output signal TRANSFER SELECTED BIT STORAGE BUFFER POSITION TO OUTPUT REGISTER is emitted from the skew cycle control circuit 28. This signal is utilized to gate the bits in the selected position of the bit storage buffer 12 through AND circuits 34–34*n* whereby the character selected by the read-out counter 24 is transferred to the output register 32.

The skew cycle control circuit 28 also emits a signal RESET SELECTED BIT STORAGE BUFFER POSITION which is utilized to reset the position of the bit storage buffers from which the character has been read.

The skew cycle control circuit 28 also produces a signal ADVANCE READ-OUT COUNTER which serves to advance the read-out counter 24 thereby conditioning it to read out the next character and finally, the skew cycle control circuit 28 may produce a signal OUTPUT REGISTER TO OUTPUT BUFFER REGISTER by which characters in the output register 32 may be gated therefrom into system circuits such as, for example, an output buffer register (not shown).

The read-in and read-out counters are standard cyclic counters. They progress through a specific number of count indicating conditions or positions, and then they return to the initial count indicating position or condition. The read-in counters 16–16*n* and the read-out counter 24 in the specific embodiment shown each comprise two ring type counters consisting, respectively, of seven trigger elements $T_1$ through $T_4$ and $T_A$ through $T_C$. The two rings are used in combination to give a twelve place count. The twelve combinations are equivalent to a twelve position ring counter.

The advance pulses from advance control 30 advance the ring made up of triggers $T_1$ through $T_4$. When the first ring reaches a state such that trigger $T_1$ is to be turned "on" and trigger $T_4$ is to be turned "off," an advance pulse is delivered to the second ring composed of the triggers $T_A$ through $T_C$ to advance it one position. Hence twelve counts are obtained.

When the read-in counter has made a complete cycle, i.e., when it has counted to its full capacity and has started to recycle, it may appear to the circuits controlled thereby that the read-out counter is greater than the read-in counter, when, in fact, this is not the case. To account for this latter contingency, the read-in counter has an overflow trigger $T_{OF}$ which is turned "on" when the read-in counter begins to re-cycle. When the read-out counter completes a cycle, the overflow trigger $T_{OF}$ is turned "off." The overflow trigger, therefore, serves to indicate that the count of the read-in counter is ahead of the count of the read-out counter in the case where the read-in counter has cycled but the read-out counter has not cycled.

The comparing circuits 18–18$n$ are adapted to receive the outputs of the several coresponding stages of the read-in counters 16–16$n$ and the read-out counter 24 and to compare same. A signal is emitted when the setting of the read-in counter is greater than the setting of the read-out counter. The condition of the $T_{OF}$ trigger is also taken into account in order to prevent a false output when the read-in counter has recycled and the read-out counter has not yet recycled (as described in copending application, Serial No. 745,501).

The read-out gates 20 are controlled by the read-out counter 24 as described; however, in the embodiment shown since the read-out counter 24 only has seven triggers which in combination indicate twelve counts, a read-out decoder 26 is necessary to control the twelve track read-out gates in each of the circuits 20–20$n$.

The bit storage buffers 12–12$n$ are provided with a sufficient number of bit storage triggers to accommodate the most aggravated skew condition usually encountered. Herein, the bit storage buffers have been illustrated as comprising 12 triggers storage positions 1 to 12. This is an arbitrary capacity selected for the purpose of simplifying the disclosure and it is contemplated that the storage capacity of the several bit storage buffers in each case will be sufficient to control whatever skew condition may normally be encountered. However, the possibility does exist that under some unusual condition the capacity of the bit storage buffers will be exceeded.

The circuits of this invention will indicate this overflow condition in a manner to be described. The number of bits stored in a bit storage buffer at any particular time will be a measure of the skew existing at that time between the channel associated with the bit storage buffer under consideration and the most lagging channel, (i.e. that channel which is farthest behind). This is true since the read-in operation to any particular bit storage buffer is independent of the other channels, but the read-out operation is controlled by the most lagging channel.

Satisfactory operation of the embodiments of the invention herein shown depends upon the fact that variations in the amount of skew present in the system varies relatively slowly in comparison to the cyclic rate of the skew buffer. Hence, a measurement of the skew existing when the read-out counter is at position one is indicative of the skew during the rest of the cycle of the skew buffer. Furthermore, the amount of skew will not change by more than one bit length during a cycle of the skew buffer.

Figure 4:
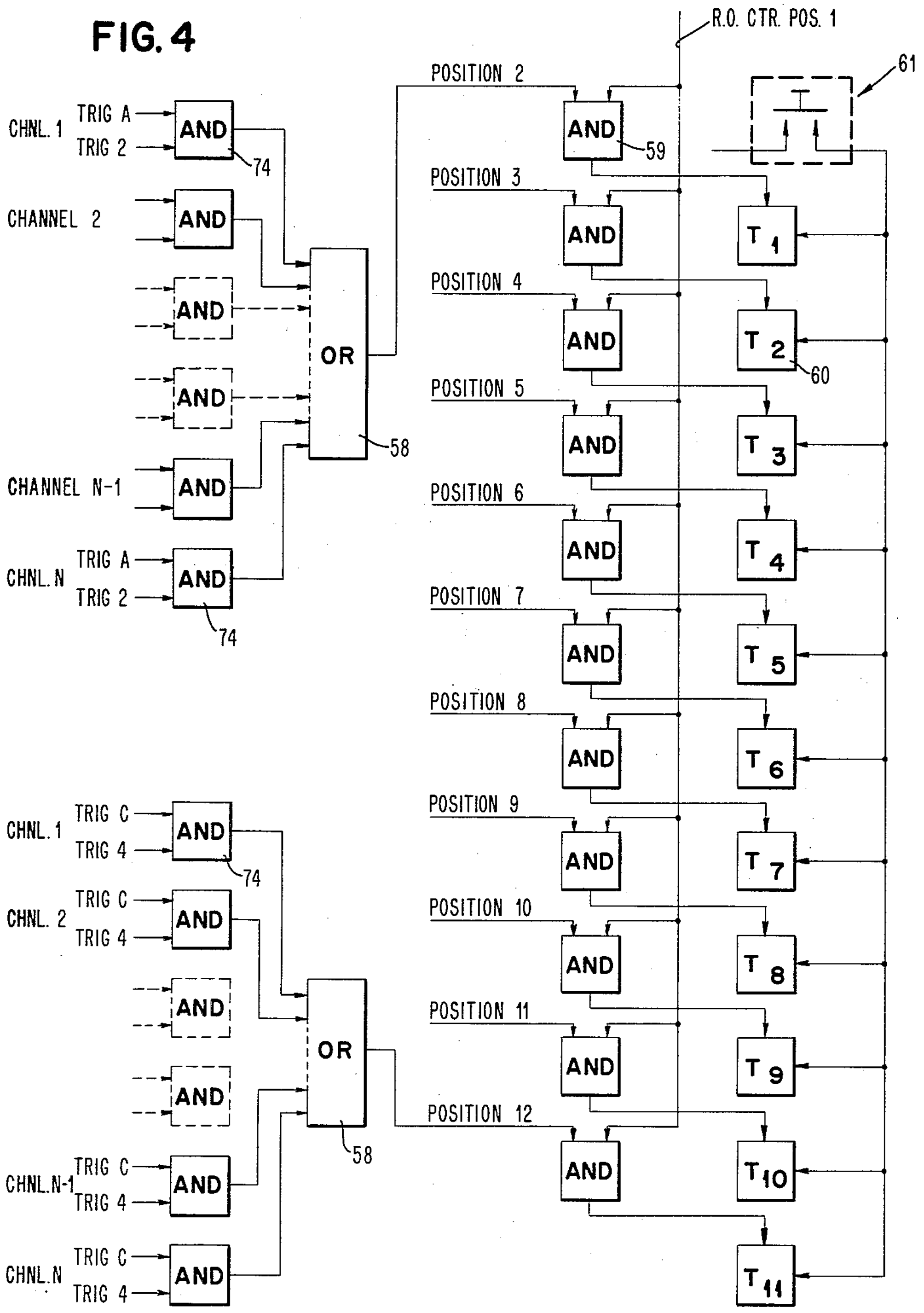
FIG. 4 is the block diagram for a circuit which indicates the maximum skew that has occurred.
Figure 5:
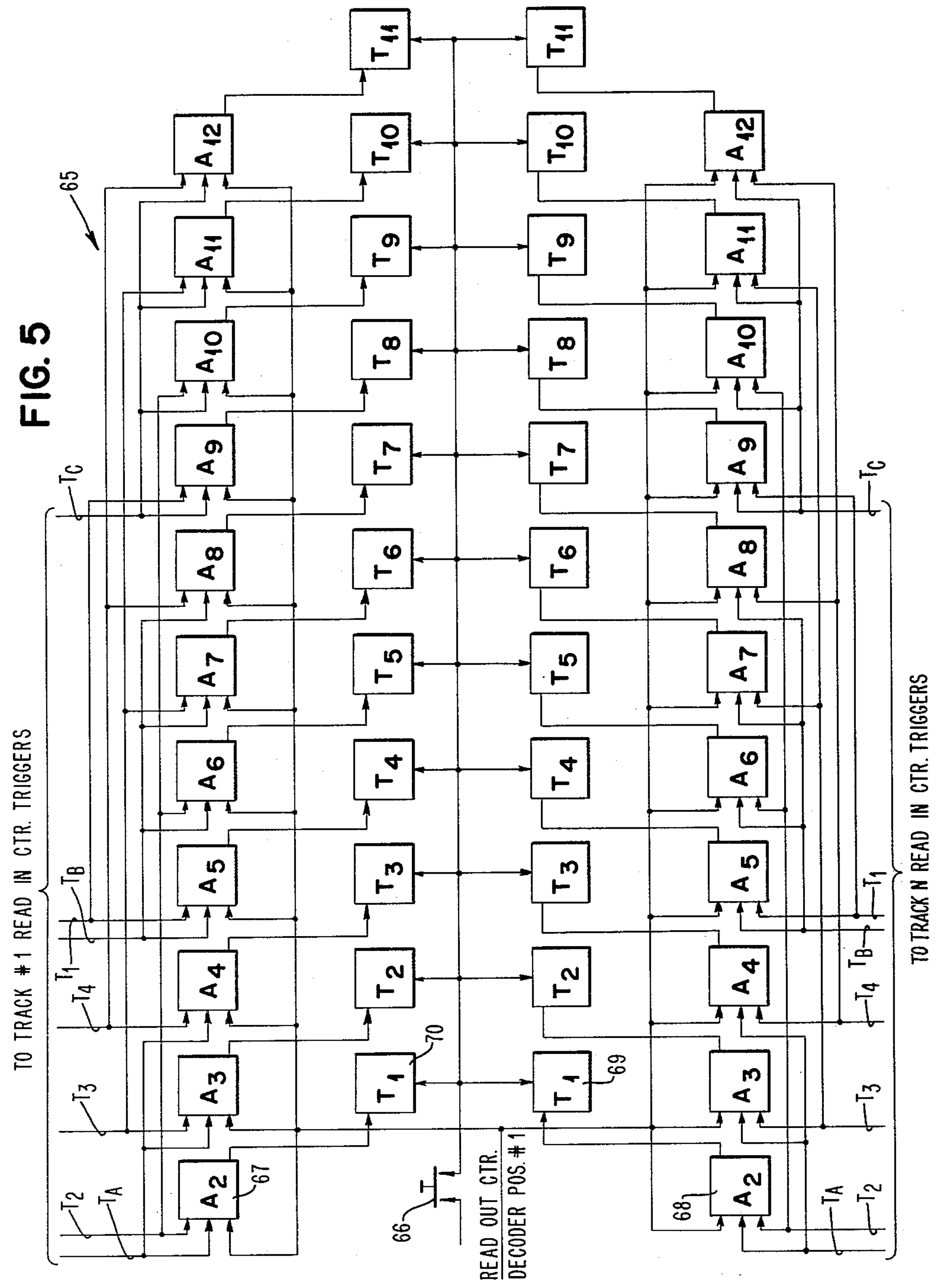
FIG. 5 is the block diagram of an alternate circuit for indicating the maximum skew that has occurred.

By examining the count in the read-in counters of the various channels when the read-out counter is at position one, a measure of skew is obtained. The circuits shown in FIGURES 2 and 6 merely indicate that excess skew exists. The circuits shown in FIGURES 4 and 5 give a quantitative measure of skew.

Excessive skew in any channel is indicated by an indicator 52 (FIG. 2) one of which is associated with each channel. Said indicators are activated whenever excessive skew in the channel under consideration causes the following inputs to be present at the particular AND circuit 51 which is associated with the channel under consideration ($a$) a signal from position one of the read-out counter decoder 26 ($b$) a signal from the read-in counter 16 trigger $T_1$ of the channel under consideration ($c$) a signal from the read-in counter 16 trigger $T_A$ of the channel under consideration ($d$) a reset check pulse from the 200 millimicrosecond delay circuit 50 which is activattd by advance control 30. (Signals $b$ and $c$ essentially being a signal from position one of the read-in counter.)

The output from AND circuit 51 activates indicator 52 and also provides an input signal to AND circuit 22 to replace the signal from the associated compare circuit 18, thereby allowing the other buffer positions to read-out and possibly allowing continued operation of the other read channels if such is desired. The necessity of a signal from the 200 millimicrosecond delay 50 prevents circuit 51 from giving an output when the read-in and read-out counters are both initially in position one.

Figure 3:
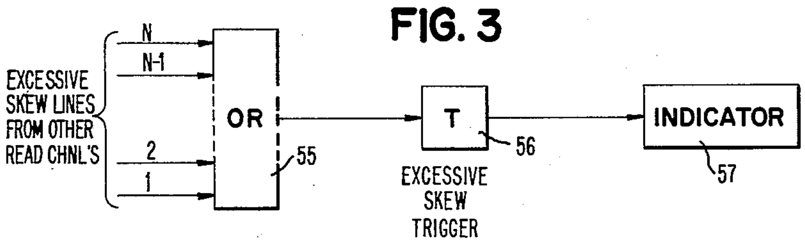
FIG. 3 is the block diagram for a circuit which indicates that excessive skew has occurred in some channel.

The N input OR circuit 55 (FIG. 3) receives inputs from the AND circuit 51 of each of the channels, thereby activating trigger 56 and indicator 57 whenever any channel has excessive skew.

The maximum skew that has occurred in any channel can be indicated by the circuit shown in FIG. 4. Each buffer position from two to twelve has a plurality of AND circuits 74, one for each channel, and OR circuit 58, and AND circuit 59, and a trigger 60. Note, FIGURE 4 only shows AND circuits 74 and OR circuits 58 for buffer positions two and twelve. Each of the other buffer positions has circuits 74 and 58 identical to the ones shown.

When the read-out counter 24 reaches position one, every AND circuit 59 which receives an input from the corresponding OR circuit 58 will be conditioned so that it will give an output, thereby activating the corresponding trigger 60. Each OR circuit 58 is associated with a particular position of the read-in counters 16–16$n$ and is activated by AND circuit 74 to give an output if any of said counters are in the assoicated position. Triggers $T_A$ and $T_2$ constitute position two of each read-in counter 16 of FIG. 1, triggers $T_A$ and $T_3$ constitute position three, triggers $T_C$ and $T_4$ constitute position twelve, etc.

Hence, when the read-out counter 24 reaches position one every AND circuit 59 and the corresponding trigger 60 associated with a position of the read-in counters up to the count of the read-in counter in the leading channel (i.e. that channel which is farthest ahead) will be activated. Since the read-out counter 24 is controlled by the channel farthest behind we will have an indication of the amount of skew between the most leading and the most lagging channels. Triggers 60 may be reset by reset button 61.

The maximum bits of skew which occurred may also be indicated by the circuit 65 (FIG. 5). Here merely the read-in counters of tracks one and N are examined when the read-out counter is at position one. Assuming that one of the side channels will be the leading channel, this circuit will show the maximum skew that has occurred since the reset button 66 was last pushed. The AND circuits 67 and 68 which respectively receive inputs from positions two (trig A and trig 2) to position twelve (trig C and trig 4) of the read-in counter 16 of channel one and channel N effectively examine the count of the read-in counters of channel one and channel N when the read-out counter is at position one. When AND circuits 67 and 68 are conditioned by a signal from position one of the read-out counter decoder 26, those AND circuits 67 and 68 which are associated with the positions of the read-in counters which are activated at that time will emit a signal, thereby switching the corresponding triggers 69.

Figure 2:
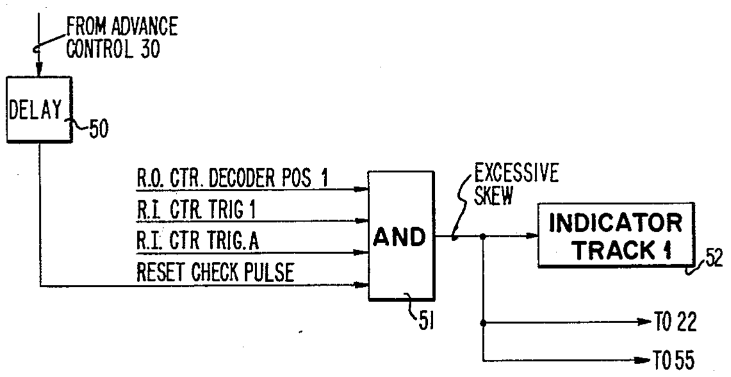
FIG. 2 is the block diagram of an excessive skew indicating circuit for one channel.
Figure 6:
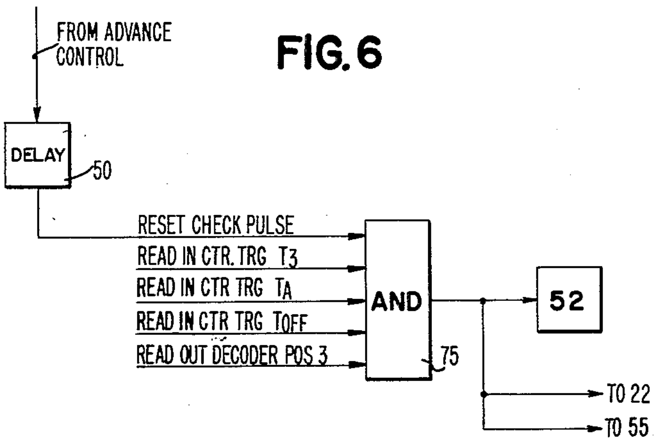
FIG. 6 is the block diagram of an alternate embodiment of an excessive skew indicating circuit for one channel.

It is recognized that the checking means could be associated with other positions of the read-out counter; however, if this were done, the state of the $T_{OF}$ trigger in the read-in counter 16 would have to be taken into consideration. An alternate embodiment of the single channel excessive skew indicator shown in FIG. 2 is shown in FIG. 6; the five-input AND circuit 75 will give an output if ($a$) the read-in counter 16 has made one more cycle than the read-out counter 24 (indicated by the signal from $T_{OF}$) and ($b$) both counters are simultaneously at position three. The signals from read-in counter triggers $T_3$ and $T_A$ indicate that the read-in counter is at position three and a signal from position three of the read-out decoder 26 is used to indicate that the read-out counter is at position three. Alternatively any other position of the counters could be compared.

Any of the multi-input OR circuits shown may actually comprise a plurality of cascaded OR circuits; however, this technique is well-known in the art.

While the invention has been particularly shown and described with reference to preferred embodiments thereof, it will be understood by those skilled in the art that various changes in form and details may be made therein without departing from the spirit and scope of the invention.

What is claimed is:

1. In a system for reading a multichannel magnetic tape comprising, a plurality of skew buffer storage registers capable of storing a sequence of characters, clocking means associated with each buffer for gating characters into respective buffers, a plurality of read-in counters, each one associated with a different buffer and capable of counting the number of characters gated into respective buffers and each of said read-in counters having a predetermined capacity of count indicating positions including a first position to which the counter returns after having counted up to its capacity, a read-out counter having a plurality of count indicating positions including a first position, comparing means for comparing the position of each of said read-in counters with the position of said read-out counter, and means responsive to said comparing means for advancing said read-out counter one position when the position of each of said read-in counters is greater than the position of said read-out counter;

the combination with said read-out counter, read-in counters and clocking means of a plurality of AND circuits, each one associated with a different one of said buffers, circuit means for coupling a signal representative of the first position of said read-out counter to each of said AND circuits, circuit means for coupling a signal representative of the first position of each of said read-in counters to the associated AND circuit, and signal delaying means connected to each of said clocking means for coupling a signal delayed in time representing the gating of characters into said buffers to the associated AND circuit, said AND circuits including means for indicating the concurrence of signals coupled thereto, thereby providing an indication of the presence of skew equal to the capacity of read-in counters.

2. In a system for reading a multichannel magnetic tape comprising, a plurality of skew buffer storage registers capable of storing a sequence of characters, clocking means associated with each buffer for gating characters into respective buffers, a plurality of read-in counters, each one associated with a different buffer and capable of counting the number of characters gated into respective buffers, and each of said read-in counters having a predetermined capacity of count indicating positions, a read-out counter having a plurality of count indicating positions including a first position, comparing means for comparing the position of each of said read-in counters with the position of said read-out counter, means responsive to said comparing means for advancing said read-out counter one position when the position of each of said read-in counters is greater than the position of said read-out counter;

the combination with said read-out counter and read-in counters of a number of OR circuits equal to the capacity of count indicating positions in said read-in counters, circuit means for coupling signals representative of corresponding positions in each of said read-in counters to respective ones of said OR circuits, each position to a different one of said OR circuits, a plurality of AND circuits, each one responsive to the output of a different one of said OR circuits, circuit means for coupling a signal representative of the first position of said read-out counter to each of said AND circuits, and means connected to each of said AND circuits for indicating the concurrence of signals applied thereto.

3. In a system for reading a magnetic tape having characters recorded thereon in a multiplicity of parallel tracks including two side tracks located near the edge of the tape comprising, a plurality of reading channels, one for each tape track, a plurality of skew buffer storage registers, each one capable of storing a sequence of characters from respective ones of said reading channels, clocking means associated with each buffer for gating characters into respective buffers, a plurality of read-in counters, each one associated with a different buffer and capable of counting the number of characters gated into respective buffers, and each of said read-in counters having a predetermined capacity of count indicating positions, a read-out counter having a plurality of count indicating positions including a first position, comparing means for comparing the position of each of said read-in counters with the position of said read-out counter, and means responsive to said comparing means for advancing said read-out counter one position when the position of each of said read-in counters is greater than the position of said read-out counter;

the combination with said read-out counter and read-in counters of two groups of AND circuits, each group including a number of AND circuits equal to the capacity of count indicating positions of said read-in counters, circuits means for coupling signals representative of the positions of the read-in counter associated with one of said two side tracks to respective ones of the AND circuits in one of said two groups, circuit means for coupling signals representative of the positions of said read-in counter associated with the other of said two side tracks to respective ones of the AND circuits in the other of said two groups, circuit means for coupling a signal representative of the first position of said read-out counter to each of said AND circuits in both groups, and means connected to each of said AND circuits for indicating the concurrence of signals applied thereto.

References Cited in the file of this patent

UNITED STATES PATENTS

| | | |
|---|---|---|
| 2,668,285 | Curry | Feb. 2, 1954 |
| 2,731,621 | Sontheimer | Jan. 17, 1956 |
| 2,828,478 | Johnson | Mar. 25, 1958 |
| 2,871,289 | Cox | Jan. 27, 1959 |
| 2,885,655 | Smoliar | May 5, 1959 |
| 2,905,927 | Reed | Sept. 22, 1959 |
| 2,907,004 | Chien | Sept. 29, 1959 |
| 2,921,296 | Floros | Jan. 12, 1960 |